United States Patent
Ueda et al.

(10) Patent No.: US 9,297,932 B2
(45) Date of Patent: Mar. 29, 2016

(54) POLARIZER PROTECTIVE FILM, POLARIZING PLATE, AND IMAGE DISPLAY APPARATUS

(75) Inventors: Ken-ichi Ueda, Nara (JP); Shigeo Otome, Kyoto (JP); Mie Nakata, Osaka (JP); Yuuki Nakano, Osaka (JP)

(73) Assignees: NIPPON SHOKUBAI CO., LTD, Osaka-shi (JP); NITTO DENKO CORPORATION, Ibaraki-shi (JP)

(*) Notice: Subject to any disclaimer, the term of this patent is extended or adjusted under 35 U.S.C. 154(b) by 681 days.

(21) Appl. No.: 12/282,310

(22) PCT Filed: Feb. 27, 2007

(86) PCT No.: PCT/JP2007/053668
§ 371 (c)(1),
(2), (4) Date: Sep. 9, 2008

(87) PCT Pub. No.: WO2007/105485
PCT Pub. Date: Sep. 20, 2007

(65) Prior Publication Data
US 2009/0067047 A1    Mar. 12, 2009

(30) Foreign Application Priority Data
Mar. 10, 2006 (JP) .................. 2006-065064

(51) Int. Cl.
*G02B 1/10* (2015.01)
*G02B 5/30* (2006.01)

(52) U.S. Cl.
CPC .............. *G02B 1/105* (2013.01); *G02B 5/3033* (2013.01); *B32B 2457/202* (2013.01)

(58) Field of Classification Search
USPC .................. 428/1.33, 1.54; 349/96, 122
See application file for complete search history.

(56) References Cited

U.S. PATENT DOCUMENTS 5,063,259 A * 11/1991 Wanat et al. .................. 523/201
5,324,781 A *  6/1994 Date et al. .................... 525/80
(Continued)

FOREIGN PATENT DOCUMENTS

| CN | 1315663 A | 10/2001 |
|---|---|---|
| CN | 1413304 A | 4/2003 |

(Continued)

OTHER PUBLICATIONS

Wikipedia, Poly(methyl methacrylate), Wikimedia Foundation, Sep. 11, 2010.*

(Continued)

*Primary Examiner* — Gwendolyn Blackwell
*Assistant Examiner* — Anthony J Frost
(74) *Attorney, Agent, or Firm* — Westerman, Hattori, Daniels & Adrian, LLP

(57) ABSTRACT

Provided is a polarizer protective film, which has high heat resistance, high transparency, high optical characteristics, and high mechanical strength, and is excellent in adhesion with respect to a polarizer. Further, provided are a polarizing plate using such a polarizer protective film and a polarizer, which has high adhesion with respect to the polarizer protective film and the polarizer and is excellent in optical characteristics, and an image display apparatus of high quality using such a polarizing plate.

A polarizer protective film according to the present invention includes a (meth)acrylic resin having a lactone ring structure and core-shell type nanoparticles having a core layer made of a rubber polymer and a shell layer made of a glass polymer.

13 Claims, 2 Drawing Sheets

(56) References Cited

U.S. PATENT DOCUMENTS

| | | | |
|---|---|---|---|
| 5,914,073 A | 6/1999 | Kobayashi et al. | |
| 6,726,995 B2 | 4/2004 | Ishii et al. | |
| 6,894,113 B2 * | 5/2005 | Court et al. | 525/88 |
| 6,961,178 B2 * | 11/2005 | Sugino et al. | 359/485.03 |
| 7,154,572 B2 | 12/2006 | Lee et al. | |
| 7,270,776 B2 | 9/2007 | Mori et al. | |
| 2002/0192397 A1 | 12/2002 | Tsujimoto | |
| 2003/0091792 A1 | 5/2003 | Ishii et al. | |
| 2004/0051825 A1 | 3/2004 | Lee et al. | |
| 2004/0066482 A1 * | 4/2004 | Tanaka | 349/141 |
| 2006/0022790 A1 | 2/2006 | Mori et al. | |
| 2007/0046856 A1 | 3/2007 | Lee et al. | |
| 2007/0243364 A1 * | 10/2007 | Maekawa et al. | 428/220 |
| 2009/0137743 A1 | 5/2009 | Ito et al. | |

FOREIGN PATENT DOCUMENTS

| | | | | |
|---|---|---|---|---|
| CN | 1482502 A | 3/2004 | | |
| JP | 5-119217 A | 5/1993 | | |
| JP | 9-113728 A | 5/1997 | | |
| JP | 9-325329 A | 12/1997 | | |
| JP | 2001-151814 A | 6/2001 | | |
| JP | 2003-121646 A | 4/2003 | | |
| JP | 2003201381 A * | 7/2003 | | C08L 33/14 |
| JP | 2004-285297 A | 10/2004 | | |
| JP | 2005-162835 A | 6/2005 | | |
| JP | 2005-281589 A | 10/2005 | | |
| JP | 2005-294552 A | 10/2005 | | |
| JP | 2005281589 A * | 10/2005 | | C08L 65/00 |
| JP | 2006-13378 A | 1/2006 | | |
| WO | 2005-105918 A1 | 11/2005 | | |
| WO | 2006/025445 A1 | 3/2006 | | |

OTHER PUBLICATIONS

JPO Website Machine English Translation of JP05-119217, Takashi et al., May 18, 1993.*

JPO Website Machine English Translation of JP 2003-201382, Tomomasa et al., Jul. 18, 2003.*

JPO Website Machine English Translation of JP 2004-168882, Morishita et al., Jun. 17, 2004.*

JPO Website Machine English Translation of JP 2002-060424, Asano et al., Feb. 26, 2002.*

International Search Report of PCT/JP2007/053668, date of mailing May 15, 2007.

Japanese Office dated May 23, 2012, issued in corresponding application No. 2008-505042, with English translation.

* cited by examiner

POLARIZER PROTECTIVE FILM, POLARIZING PLATE, AND IMAGE DISPLAY APPARATUS

TECHNICAL FIELD

The present invention relates to a polarizer protective film, a polarizing plate using the same, and an image display apparatus such as a liquid crystal display apparatus, an organic EL display apparatus, or a PDP including at least the one polarizing plate.

BACKGROUND ART

A liquid crystal display apparatus must have polarizing plates arranged on both sides of a glass substrate forming the surface of a liquid crystal panel due to its image forming system. An example of such a polarizing plate to be used is generally manufactured by attaching a polarizer protective film formed of a cellulose-based resin film such as triacetyl cellulose on each side of a polarizer made of a polyvinyl alcohol-based film and a dichromatic substance such as iodine by using a polyvinyl alcohol-based adhesive.

However, the cellulose-based resin film has insufficient heat and humidity resistance and thus has a problem in that properties such as a degree of polarization and a hue of a polarizing plate degrade when a polarizing plate using a cellulose-based resin film as a polarizer protective film is used under high temperature or high humidity conditions. Further, a cellulose-based resin film causes retardation with respect to incident light in an oblique direction. With recent increase in size of a liquid crystal display, increasingly, the retardation has significant effects on viewing angle properties.

As a resin material excellent in heat resistance and optical transparency, a (meth)acrylic resin such as polymethylmethacrylate is well known. However, the (meth)acrylic resin is brittle and is easily cracked, which causes a problem in transportation such as breakage during film transportation, and a problem of poor productivity. Therefore, it is difficult to use the (meth)acrylic resin as it is for a polarizer protective film.

In order to solve the above problems, a polarizer protective film is proposed, which is formed of a composition composed of an acrylic resin (A) containing methyl methacrylate as a main component and a toughness modifier (B) (preferably, shock resistant acrylic rubber-methyl methacrylate graft copolymer and a butyl-denatured acetyl cellulose) (see Patent Document 1). However, the polarizer protective film has a problem in that a relatively great amount of the toughness modifier (B) is used so as to enhance the mechanical strength (acrylic resin (A)/toughness modifier (B)=60/40 to 90/10 in a weight ratio), and consequently, the high heat resistance, high transparency, and high optical characteristics originally owned by the acrylic resin (A) may be impaired.

On the other hand, as a resin having higher heat resistance, higher transparency, and higher mechanical strength compared with a conventional (meth)acrylic resin such as methyl methacrylate, a (meth)acrylic resin having a lactone ring structure is known (see Patent Document 2). However, in the case of using the (meth)acrylic resin having a lactone ring structure as a polarizer protective film as it is, when an easy adhesion treatment (for example, a corona treatment) is conducted with respect to a film surface so as to enhance the adhesion with respect to the polarizer, a cohesive failure may occur in the vicinity of the surface of the film, and the adhesion with respect to the polarizer may not be exhibited sufficiently.

Patent Document 1: JP 05-119217 A
Patent Document 2: JP 2001-151814 A

DISCLOSURE OF THE INVENTION

Problems to be Solved by the Invention

The present invention has been made in view of solving the above conventional problem, and an object of the present invention is to provide (1) a polarizer protective film having high heat resistance, high transparency, high optical characteristics, and high mechanical strength, and being excellent in adhesion with respect to a polarizer, (2) a polarizing plate using such an optical protective film and a polarizer, which has high adhesion with respect to the polarizer protective film and the polarizer and is excellent in optical characteristics, and (3) an image display apparatus of high quality using such a polarizing plate.

Means for Solving the Problems

The inventors of the present invention have studied the technical means for preventing cohesive failure caused by an easy adhesion treatment without impairing the high heat resistance, high transparency, and high mechanical strength of a (meth)acrylic resin having a lactone ring structure. As a result, it was found that cohesive failure caused by an easy adhesion treatment can be prevented without impairing the high heat resistance, high transparency, and high mechanical strength of a (meth)acrylic resin having a lactone ring structure by adding core-shell type nanoparticles having a core layer made of a rubber polymer and a shell layer made of a glass polymer, whereby all the above problems can be solved.

A polarizer protective film according to the present invention includes a (meth)acrylic resin having a lactone ring structure and core-shell type nanoparticles having a core layer made of a rubber polymer and a shell layer made of a glass polymer.

In a preferred embodiment, the polarizer protective film includes 1 to 40 parts by weight of the core-shell type nanoparticles with respect to 100 parts by weight of the (meth)acrylic resin having a lactone ring structure.

In a preferred embodiment, the core-shell type nanoparticles have a particle diameter of 1 to 1,000 nm.

According to another aspect of the present invention, a polarizing plate is provided. The polarizing plate of the present invention includes a polarizer formed of a polyvinyl alcohol-based resin and the polarizer protective film of the present invention.

In a preferred embodiment, the polarizing plate includes an easy adhesion layer and an adhesive layer between the polarizer protective film and the polarizer.

In a preferred embodiment, the adhesive layer is formed of a polyvinyl alcohol-based adhesive.

In a preferred embodiment, the polarizing plate includes a cellulose-based resin film on a side of the polarizer opposite to the polarizer protective film.

In a preferred embodiment, the polarizing plate further includes a pressure-sensitive adhesive layer as at least one of an outermost layer.

According to another aspect of the present invention, an image display apparatus is provided. The image display apparatus of the present invention includes at least one polarizing plate of the present invention.

Effects Of The Invention

According to the present invention, a polarizer protective film can be provided, which can prevent cohesive failure caused by an easy adhesion treatment without impairing the high heat resistance, high transparency, and high mechanical strength of a (meth)acrylic resin having a lactone ring structure, and which has high heat resistance, high transparency, high optical characteristics, and high mechanical strength, and is excellent in adhesion with respect to a polarizer. Further, a polarizing plate using such a polarizer protective film and a polarizer can be provided, which has high adhesion with respect to the polarizer protective film and the polarizer and is excellent in optical characteristics, and an image display apparatus of high quality using such a polarizing plate can be provided.

In a polarizer protective film containing a (meth)acrylic resin as a main component, such as conventional methyl methacrylate, both the high heat resistance, high transparency, high optical characteristics, and high mechanical strength, and the high adhesion with respect to a polarizer cannot be satisfied. According to the present invention, by using a (meth)acrylic resin having a lactone ring structure and core-shell type nanoparticles with a particular structure, both the high heat resistance, high transparency, high optical characteristics, high mechanical strength, and the high adhesion with respect to a polarizer can be satisfied in the polarizer protective film.

Figure 1:
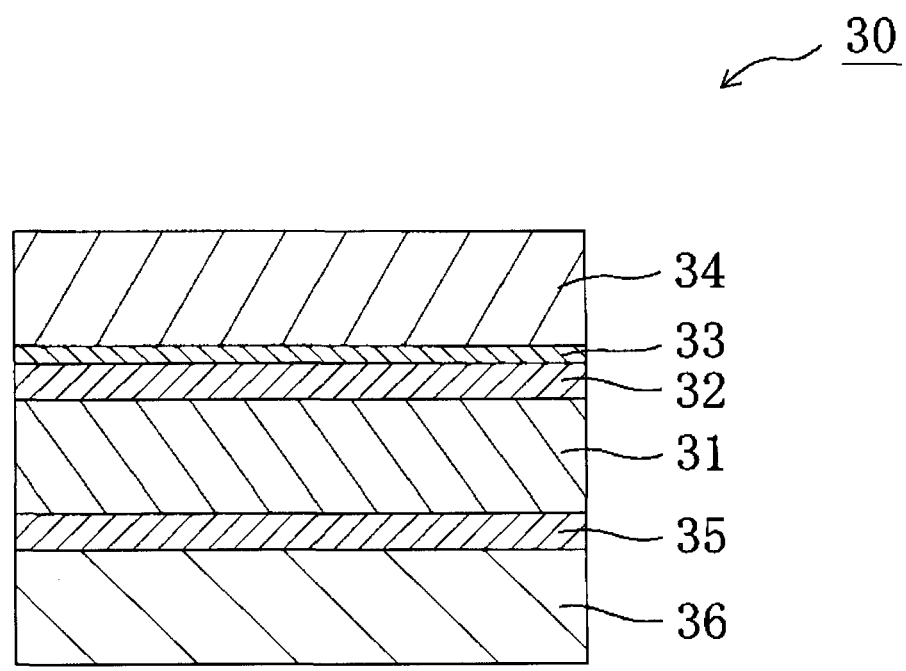
[FIG. 1] A cross-sectional view showing an example of a polarizing plate of the present invention.

DESCRIPTION OF REFERENCE NUMERALS 10 liquid crystal cell
11, 11' glass substrate
12 liquid crystal layer
13 spacer
20, 20' retardation film
30, 31' polarizing plate
31 polarizer
32 adhesive layer
33 easy adhesion layer
34 polarizer protective film
35 adhesive layer
36 polarizer protective film
40 light guide plate
50 light source
60 reflector
100 liquid crystal display apparatus

DETAILED DESCRIPTION OF THE INVENTION

Hereinafter, preferred embodiments of the present invention will be described; however, the present invention is not limited thereto.

[Polarizer Protective Film]

A polarizer protective film of the present invention contains a (meth)acrylic resin having a lactone ring structure and core-shell type nanoparticles with a particular structure.

Examples of the (meth)acrylic resin having a lactone ring system include (meth)acrylic resins having a lactone ring system described in JP 2000-230016 A, JP 2001-151814 A, and JP 2005-146084 A.

The (meth)acrylic resin having a lactone ring system preferably has a lactone ring system represented by the following General Formula (1).

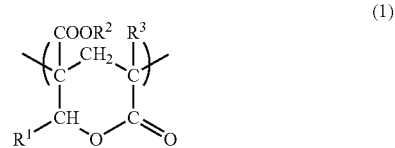

(In General Formula (1), $R^1$, $R^2$, and $R^3$ independently represent hydrogen atoms or organic residues containing 1 to 20 carbon atoms. The organic residues may contain oxygen atoms.)

The content ratio of the lactone ring system represented by General Formula (1) in the structure of the (meth)acrylic resin having a lactone ring system is preferably 5 to 90% by weight, more preferably 10 to 70% by weight, still more preferably 10 to 60% by weight, and particularly preferably 10 to 50% by weight. When the content ratio of the lactone ring system represented by General Formula (I) in the structure of the (meth)acrylic resin having a lactone ring system is smaller than 5% by weight, the heat resistance, solvent resistance, and surface hardness may become insufficient. When the content ratio of the lactone ring system represented by General Formula (1) in the structure of the (meth)acrylic resin having a lactone ring system is larger than 90% by weight, the forming property may become poor.

The mass average molecular weight (which may be referred to as weight average molecular weight) of the (meth) acrylic resin having a lactone ring system is preferably 1,000 to 2,000,000, more preferably 5,000 to 1,000,000, still more preferably 10,000 to 500,000, and particularly preferably 50,000 to 500,000. When the mass average molecular weight is out of the above range, the effects of the present invention may not be exhibited sufficiently.

The Tg (glass transition temperature) of the (meth)acrylic resin having a lactone ring system is preferably 115° C. or higher, more preferably 125° C. or higher, still more preferably 130° C. or higher, particularly preferably 135° C. or higher, and most preferably 140° C. or higher. When the Tg is 115° C. or higher, for example, in a case where the (meth) acrylic resin having such a Tg is finally incorporated in a polarizing plate, the polarizing plate is likely to have excellent durability. The upper limit value of the Tg of the (meth) acrylic resin having a lactone ring system is not particularly limited. However, it is preferably 150° C. or lower in view of a forming property and the like.

Regarding the (meth)acrylic resin having a lactone ring system, the total light transmittance measured by a method pursuant to ASTM-D-1003 of a molding obtained by injection molding is preferably as high as possible, and is preferably 85% or higher, more preferably 88% or higher, and still more preferably 90% or higher. The total light transmittance is an index of transparency. When the total light transparency is less than 85%, the transparency decreases, which may make it impossible to use the resultant polarizing plate for the intended application.

It is preferred that the above-mentioned (meth)acrylic resin have a high light transmittance, and a low in-plane retardation And and a low thickness direction retardation Rth.

The content of the (meth)acrylic resin having a lactone ring structure in the polarizer protective film of the present invention is preferably 50 to 99% by weight, more preferably 60 to 98% by weight, and much more preferably 70 to 97% by weight. In the case where the content of the (meth)acrylic resin having a lactone ring structure in the polarizer protective film of the present invention is less than 50% by weight, there is a possibility that the high heat resistance, high transparency, and high mechanical strength originally owned by the (meth)acrylic resin having a lactone structure may not be reflected sufficiently, and in the case where the content exceeds 99% by weight, the adhesion with respect to a polarizer may be degraded.

The polarizer protective film of the present invention also contains core-shell type nanoparticles with a particular structure.

The core-shell type nanoparticles are core-shell type nanoparticles having a core layer made of a rubber polymer and a shell layer made of a glass polymer. Tg of the rubber polymer constituting the core layer is preferably 20° C. or less, more preferably −60 to 20° C., and much more preferably −60 to 10° C. When Tg of the rubber polymer constituting the core layer exceeds 20° C., the effects of the present invention may not be exhibited. Tg of the glass polymer constituting the shell layer is preferably 50° C. or more, more preferably 50 to 140° C., and much more preferably 60 to 130° C. When Tg of the glass polymer constituting the shell layer is lower than 50° C., the effects of the present invention may not be exhibited.

The content ratio of the core layer in the core-shell type nanoparticles is preferably 30 to 95% by weight, more preferably 50 to 90% by weight. The content ratio of the shell layer in the core-shell type nanoparticles is preferably 5 to 70% by weight, more preferably 10 to 50% by weight.

The core-shell type nanoparticles may contain any suitable other components in a range not impairing the effects of the present invention.

As a polymerizable monomer forming the rubber polymer constituting the core layer, any suitable polymerizable monomer can be adopted.

It is preferred that the polymerizable monomer forming the rubber polymer contain alkyl(meth)acrylate. "Alkyl(meth) acrylate" refers to alkylacrylate or alkylmethacrylate collectively. The polymerizable monomer forming the rubber polymer contains alkyl(meth)acrylate in an amount of preferably 50% by weight, more preferably 50 to 99.9% by weight, and much more preferably 60 to 99.9% by weight.

Examples of the above-mentioned alkyl(meth)acrylate include alkyl(meth)acrylates including alkyl groups having 2 to 20 carbon atoms such as ethyl(meth)acrylate, propyl(meth) acrylate, butyl (meth)acrylate, cyclohexyl(meth)acrylate, 2-ethylhexyl (meth)acrylate, isononyl(meth)acrylate, lauroyl (meth)acrylate, and stearyl(meth)acrylate. Of those, alkyl (meth)acrylates including alkyl groups having 2 to 10 carbon atoms such as butyl (meth)acrylate, 2-ethylhexyl(meth)acrylate, and isononyl (meth)acrylate are preferable, and butyl acrylate, 2-ethylhexyl acrylate, and isononyl acrylate are more preferable. One of them may be used alone, or two or more thereof may be used in combination.

It is preferred that the polymerizable monomer forming the rubber polymer contain a polyfunctional monomer having two or more vinyl groups in the molecule. The polymerizable monomer forming the rubber polymer contains the polyfunctional monomer having two or more vinyl groups in the molecule in an amount of preferably 0 to 20% by weight, more preferably 0.1 to 20% by weight, much more preferably 0.1 to 10% by weight, and particularly preferably 0.2 to 5% by weight.

Examples of the polyfunctional monomers having two or more vinyl groups in the molecule include: aromatic divinyl monomers such as divinyl benzene; alkanepolyol poly(meth) acrylates such as ethyleneglycol di(meth)acrylate, butyleneglycol di(meth)acrylate, hexanediol di(meth)acrylate, oligoethylene glycol di(meth)acrylate, trimethylolpropane di(meth) acrylate, and trimethylolpropane tri(meth)acrylate; and urethane di(meth)acrylate and epoxy di(meth)acrylate. Further, examples of polyfunctional monomers having vinyl groups with dissimilar reactivity include: allyl(meth)acrylate, diallyl maleate, diallyl fumarate, and diallyl itaconate. Of those, ethyleneglycol dimethacrylate, butyleneglycol diacrylate, and allylmethacrylate are preferable. One of them may be used alone, or two or more thereof may be used in combination.

The polymerizable monomer forming the rubber polymer may contain another polymerizable monomer that is copolymerizable with the alkyl(meth)acrylate and the functional monomer having two or more vinyl groups in the molecule. The polymerizable monomer forming the rubber polymer contains another polymerizable monomer in an amount of preferably 0 to 49.9% by weight and more preferably 0 to 39.9% by weight.

Examples of the above-mentioned another monomer include: aromatic vinyls such as styrene, vinyltoluene, and α-methylstyrene; vinyl cyanides such as aromatic vinylidene, acrylonitrile, and methacrylonitrile; and vinylidene cyanide, methyl methacrylate, urethane acrylate, and urethane methacrylate. Further, the other monomers include monomers having a functional group such as an epoxy group, a carboxyl group, a hydroxyl group, and an amino group. Specifically, examples of monomers having an epoxy group include glycidyl methacrylate, examples of monomers having a carboxyl group include methacrylic acid, acrylic acid, maleic acid, and itaconic acid, examples of monomers having a hydroxyl group include 2-hydroxyethyl methacrylate and 2-hydroxyethyl acrylate, and examples of monomers having an amino group include diethylaminoethyl methacrylate and diethylaminoethyl acrylate. One of them may be used alone, or two or more thereof may be used in combination.

As the polymerizable monomer forming a glass polymer constituting a shell layer, any suitable polymerizable monomer can be adopted.

It is preferred that the polymerizable monomer forming a glass polymer contain at least one kind of monomer selected from alkyl(meth)acrylate and an aromatic vinyl monomer. The polymerizable monomer forming a glass polymer contains at last one kind of monomer selected from alkyl(meth) acrylate and an aromatic vinyl monomer in an amount of preferably 50 to 100% by weight, and more preferably 60 to 100% by weight.

As the alkyl(meth)acrylate, for example, those including alkyl groups having 1 to 4 carbon atoms, such as methyl acrylate, methyl methacrylate, and ethyl methacrylate, are preferred, and methyl methacrylate is more preferred. They may be used alone or in combination of two or more kinds.

Examples of the aromatic vinyl monomer include styrene, vinyltoluene, and α-methylstyrene. Of those, styrene is preferred. They may be used alone or in combination of two or more kinds.

The polymerizable monomer forming a glass polymer may contain a polyfunctional monomer having two or more vinyl groups in the molecule. The polymerizable monomer forming a glass polymer contains the polyfunctional monomer having two or more vinyl groups in the molecule in an amount of preferably 0 to 10% by weight, 0.1 to 8% by weight, and more preferably 0.2 to 5% by weight.

Specific examples of the polyfunctional monomer having two or more vinyl groups in the molecule include those which are the same as described above.

The polymerizable monomer forming a glass polymer may contain another polymerizable monomer that is polymerizable with the alkyl(meth)acrylate and the polyfunctional monomer having two or more vinyl groups in the molecule. The polymerizable monomer forming a glass polymer may contain another polymerizable monomer in an amount of preferably 0 to 50% by weight, more preferably 0 to 40% by weight.

Examples of the another monomer include vinyl cyanide and vinylidene cyanide such as acrylonitrile and methacrylonitrile, alkyl(meth)acrylate other than those described above, urethane acrylate, and urethane methacrylate. The another monomer may have a functional group such as an epoxy group, a carboxyl group, a hydroxyl group, and an amino group. As a monomer having an epoxy group, for example, there is glycidyl methacrylate. Examples of the monomer having a carboxyl group include methacrylic acid, acrylic acid, maleic acid, and itaconic acid. Examples of the monomer having a hydroxyl group include 2-hydroxymetharyclate and 2-hydroxyacrylate. Examples of the monomer having an amino group include diethylaminoethyl methacrylate and diethylaminoethyl acrylate. They may be used alone or in combination of two or more kinds.

As a method of producing core-shell type nanoparticles that can be used in the present invention, any suitable method capable of producing core-shell type particles can be adopted. For example, there is a method of subjecting a polymerizable monomer forming a rubber polymer constituting a core layer to suspension polymerization to produce a suspension containing rubber polymer particles, and then, adding a polymerizable monomer forming a glass polymer constituting a shell layer to the suspension to effect radical polymerization, thereby obtaining core-shell type nanoparticles having a multi-layer structure in which the surface of rubber polymer particles is covered with a glass polymer.

The content of the core-shell type nanoparticles in the polarizer protective film of the present invention is preferably 1 to 40 parts by weight, more preferably 2 to 35 parts by weight, and much more preferably 5 to 30 parts by weight with respect to 100 parts by weight of the (meth)acrylic resin having a lactone ring structure. When the content of the core-shell type nanoparticles is less than 1 part by weight with respect to 100 parts by weight of the (meth)acrylic resin having a lactone ring structure, in the case where the surface of a polarizer protective film is subjected to an easy adhesion treatment (for example, a corona treatment) so as to enhance the adhesion with respect to a polarizer, cohesive failure may occur in the vicinity of the surface of the film, and the adhesion with respect to a polarizer may not be expressed sufficiently. When the content of the core-shell type nanoparticles exceeds 40 parts by weight with respect to 100 parts by weight of the (meth)acrylic resin having a lactone ring structure, the high heat resistance, high transparency, high mechanical strength originally owned by the (meth)acrylic resin having a lactone ring structure may be impaired.

The particle diameter of the core-shell type nanoparticles is preferably 1 to 1,000 nm, more preferably 10 to 900 nm, much more preferably 50 to 800 nm, and particularly preferably 100 to 700 nm. When the particle diameter of the core-shell type nanoparticles is less than 1 nm, if the surface of an optical protective film is subjected to an easy adhesion treatment (for example, a corona treatment) so as to enhance the adhesion with respect to a polarizer, cohesive failure may occur in the vicinity of the surface of the film, and the adhesion with respect to a polarizer may not be expressed sufficiently. When the particle diameter of the core-shell type nanoparticles is larger than 1,000 nm, the high heat resistance, high transparency, and high mechanical strength originally owned by a (meth)acrylic resin having a lactone ring structure may be impaired.

It is preferred that the polarizer protective film of the present invention be stretched by longitudinal stretching and/or lateral stretching.

The above-mentioned stretching may be the one (free-end uniaxial stretching) only by longitudinal stretching or the one (fixed-end uniaxial stretching) only by lateral stretching. However, it is preferably sequential stretching or simultaneous biaxial stretching with a longitudinal stretching magnification of 1.1 to 3.0 times and a lateral stretching magnification of 1.1 to 3.0 times. According to the stretching (free-end uniaxial stretching) only by longitudinal stretching and stretching (fixed-end uniaxial stretching) only by lateral stretching, the film strength increases in the stretching direction, and the strength does not increase in a direction perpendicular to the stretching direction, so there is a possibility that sufficient film strength cannot be obtained as the entire film. The above-mentioned longitudinal stretching magnification is more preferably 1.2 to 2.5 times, and still more preferably 1.3 to 2.0 times. The above-mentioned lateral stretching magnification is more preferably 1.2 to 2.5 times, and still more preferably 1.4 to 2.0 times. In a case where the longitudinal stretching magnification and the lateral stretching magnification are less than 1.1 times, the stretching magnification is too low, so there may be substantially no effects of stretching. When the longitudinal stretching magnification and the lateral stretching magnification exceed 3.0 times, stretch breaking is likely to occur due to the problem of smoothness of a film end face.

The above-mentioned stretching temperature is preferably the Tg to (Tg+30° C.) of a film to be stretched. When the above-mentioned stretching temperature is lower than the Tg, the film may be broken. When the above-mentioned stretching temperature exceeds (Tg+30° C.), the film may start melting, making it difficult to perform threading.

The polarizer protective film of the present invention is stretched by longitudinal stretching and/or lateral stretching, to thereby have excellent optical properties and mechanical strength, and enhanced productivity and reworking property.

It is preferred that the polarizer protective film of the present invention have an in-plane retardation $\Delta nd$ of 3.0 nm or less, a thickness direction retardation Rth of 10.0 nm or less, and a tear strength of 2.0 N/mm or more. The in-plane retardation $\Delta nd$, the thickness direction retardation Rth, and the tear strength are in those ranges, to thereby satisfy excellent optical properties and excellent mechanical strength.

In the polarizer protective film of the present invention, the in-plane retardation $\Delta nd$ is preferably 2.0 nm or less, more preferably 1.5 nm or less, and still more preferably 1.0 nm or less. When the above-mentioned in-plane retardation $\Delta nd$ exceeds 3.0 nm, there is a possibility that the effects of the present invention, in particular, excellent optical properties may not be exhibited. The thickness direction retardation Rth is preferably 7.0 nm or less, more preferably 5.0 nm or less, and still more preferably 3.0 nm or less. When the above-mentioned thickness direction retardation Rth exceeds 10.0 nm, the effects of the present invention, in particular, excellent optical properties may not be exhibited.

The polarizer protective film of the present invention preferably has excellent mechanical strength. The tear strength is preferably 2.1 N/mm or more, more preferably 2.2 N/mm or more, still more preferably 2.3 N/mm or more, particularly preferably 2.4 N/mm or more, and most preferably 2.5 N/mm or more. In a case where the tear strength is out of the above range, the excellent mechanical strength may not be exhibited.

In the polarizer protective film of the present invention, the moisture permeability is preferably 100 g/m²·24 hr or less, and more preferably 60 g/m²·24 hr or less. When the above-mentioned moisture permeability exceeds 100 g/m²·24 hr, the moisture resistance may be degraded.

The haze representing optical transparency of the polarizer protective film of the present invention is preferably as low as possible, and is preferably 5% or less, more preferably 3% or less, and still more preferably 1.5% or less, and particularly preferably 1% or less. When the haze is 5% or less, a film can be visually provided with satisfactory clear feeling. When the haze is 1.5% or less, if the polarizer protective film is used as a lighting member such as a window, both visibility and lighting property are obtained, and if the polarizer protective film is used as a front plate of a display apparatus, display contents can be visually recognized satisfactorily. Thus, the polarizer protective film with such a haze has a high industrial use value.

The total light transparency measured by a method in accordance with ASTM-D-1003 of the polarizer protective film of the present invention is preferably as high as possible, and is preferably 85% or more, more preferably 88% or more, and much more preferably 90% or more. When the total light transparency is less than 85%, the transparency may be decreased, and the polarizer protective film may not be used for the originally intended application.

The thickness of the polarizer protective film of the present invention is preferably 20 to 200 μm, more preferably 30 to 180 μm, still more preferably 40 to 140 μm. When the thickness of the polarizer protective film is 20 μm or more, the polarizer protective film has appropriate strength and stiffness, and offers excellent handleability during secondary processing such as lamination and printing. Further, with such a thickness, the retardation resulting from the stress during withdrawing can be easily controlled, and thus, the film can be produced stably and easily. When the thickness of the polarizer protective film is 200 μm or less, the take-up of the film is easy, and a line speed, productivity, and controllability are improved.

The polarizer protective film of the present invention may be manufactured by any method, but it is preferred to use a method of producing the polarizer protective film by subjecting a resin composition for forming an unstretched film to extrusion (melt extrusion such as a T-die method or an inflation method), casting (melt casting, etc.), or calendaring.

In the extrusion, it is not necessary to dry and scatter a solvent in an adhesive used during processing, e.g., an organic solvent in an adhesive for dry lamination or to perform a solvent drying step, and thus the extrusion is excellent in productivity. As a specific example, there is a method of forming a film by supplying a resin composition as a material to an extruder connected to a T-die, followed by melt kneading, extrusion, water-cooling, and withdrawing or winding after contacting with cooling-roll. The extruder may be of a single or twin screw type, and an additive such as a plasticizer or an antioxidant may be added.

The temperature for extrusion can be set appropriately, when the glass transition temperature of a resin composition as a material is Tg(° C.), (Tg+80)° C. to (Tg+180)° C. is preferred, and (Tg+100)° C. to (Tg+150)° C. is more preferred. When the temperature for extrusion is too low, a resin may not be formed due to lack of flowability. When the temperature for extrusion is too high, the viscosity of a resin becomes low, which may cause a problem in production stability such as non-uniform thickness of a formed product.

A material (resin composition) forming the film before stretching may contain general compounding agents such as a UV-absorber, a stabilizer, a lubricant, a processing assistant, a plasticizer, a shock resistance assistant, a retardation reducing agent, a flatting agent, an antimicrobial agent, a fungicide, and a foaming controller, in addition to the (meth)acrylic resin having a lactone ring structure and the core-shell type nanoparticles as main components.

In terms of the protection of a polarizer protective film and a liquid crystal panel, in order to provide weather resistance, the above-mentioned resin composition forming the unstretched film preferably contains a UV absorber. The melting point of the UV absorber is preferably 110° C. or higher, and more preferably 120° C. or higher. When the melting point of the UV absorber is 130° C. or higher, the volatilization during heat-melting processing occurs less, which makes it difficult to contaminate a roll in the course of production of a film. The kind of the UV absorber is not particularly limited. However, a benzotriazole-based UV absorber with a molecular weight of 400 or more and a triazine-based UV absorber with a molecular weight of 400 or more is particularly preferred. Examples of the commercially available products include "TINUVIN 1577" (manufactured by Ciba Specialty Chemicals Inc.) and "Adekastab LA-31" (manufactured by ADEKA Corporation).

Regarding the optical properties of a polarizer protective film, the retardation in in-plane and thickness directions poses a serious problem. Therefore, it is preferred that the above-mentioned resin composition forming an unstretched film contain a retardation reducing agent. As the retardation reducing agent, for example, a styrene-containing polymer such as an acrylonitrile-styrene block copolymer is preferred. The adding amount of the retardation reducing agent is preferably 30% by weight or less, more preferably 25% by weight or less, and still more preferably 20% by weight or less with respect to the (meth)acrylic resin. In a case where the retardation reducing agent is added in an amount exceeding this range, visible light may be scattered, and transparency may be impaired, with the result that the polarizer protective film may lack properties thereof.

The polarizer protective film of the present invention can be laminated onto another base. For example, the polarizer protective film of the present invention can also be laminated onto a base made of glass, a polyolefin resin, an ethylene-vinylidene copolymer to be a high barrier layer, polyester, or the like by multilayer extrusion or multilayer inflation including an adhesive resin layer. In a case where thermal adhesiveness is high, an adhesion layer may be omitted.

The polarizer protective film of the present invention can be used by being laminated onto, for example, a lighting member for construction, such as a window and a carport roof member, a lighting member for a vehicle, such as a window, a lighting member for agriculture, such as a greenhouse, an illumination member, a display member such as a front filter, or the like, in addition to the application to the protection of a polarizer. Further, the polarizer protective film of the present invention can also be used by being laminated onto a package of consumer electronics, an interior member in a vehicle, a construction material for an interior, a wall paper, a decorative laminate, a hallway door, a window frame, a foot stall, and the like, which are covered with a (meth)acrylic resin film conventionally.

[Polarizing Plate]

The polarizing plate of the present invention includes a polarizer formed of a polyvinyl alcohol-based resin and a polarizer protective film of the present invention. In one preferred embodiment of the polarizing plate of the present invention, as shown in FIG. 1, one surface of a polarizer 31 is bonded to a polarizer protective film 34 of the present invention via an adhesive layer 32 and an easy adhesion layer 33, and the other surface of the polarizer 31 is bonded to the polarizer protective film 36 via the adhesive layer 35. The polarizer protective film 36 may be the polarizer protective film of the present invention or any appropriate polarizer protective film.

The polarizer formed of a polyvinyl alcohol-based resin is generally manufactured by: coloring a polyvinyl alcohol-based resin film with a dichromatic substance (typically, iodine or a dichromatic dye); and uniaxially stretching the film. The degree of polymerization of the polyvinyl alcohol-based resin for forming the polyvinyl alcohol-based resin film is preferably 100 to 5,000, and more preferably 1,400 to 4,000. The polyvinyl alcohol-based resin film for forming the polarizer may be formed by any appropriate method (such as a flow casting method involving film formation through flow casting of a solution containing a resin dissolved in water or an organic solvent, a casting method, or an extrusion method). The thickness of the polarizer may be appropriately set in accordance with the purpose and application of LCD employing the polarizing plate, but is typically 5 to 80 μm.

For producing a polarizer, any appropriate method may be employed in accordance with the purpose, materials to be used, conditions, and the like. Typically, employed is a method in which the polyvinyl alcohol-based resin film is subjected to a series of production steps including swelling, coloring, cross-linking, stretching, water washing, and drying steps. In each of the treatment steps excluding the drying step, the polyvinyl alcohol-based resin film is immersed in a bath containing a solution to be used in each step. The order, number of times, and absence or presence of swelling, coloring, cross-linking, stretching, water washing, and drying steps may be appropriately set in accordance with the purpose, materials to be used, conditions, and the like. For example, several treatments may be conducted at the same time in one step, or specific treatments may be omitted. More specifically, stretching treatment, for example, may be conducted after coloring treatment, before coloring treatment, or at the same time as swelling treatment, coloring treatment, and cross-linking treatment. Further, for example, cross-linking treatment can be preferably conducted before and after stretching treatment. Further, for example, water washing treatment may be conducted after each treatment or only after specific treatments.

The swelling step is typically conducted by immersing the polyvinyl alcohol-based resin film in a treatment bath (swelling bath) filled with water. This treatment allows washing away of contaminants from a surface of the polyvinyl alcohol-based resin film, washing away of an anti-blocking agent, and swelling of the polyvinyl alcohol-based resin film, to thereby prevent non-uniformity such as uneven coloring. The swelling bath may appropriately contain glycerin, potassium iodide, or the like. The temperature of the swelling bath is typically about 20 to 60° C., and the immersion time in the swelling bath is typically about 0.1 to 10 minutes.

The coloring step is typically conducted by immersing the polyvinyl alcohol-based resin film in a treatment bath (coloring bath) containing a dichromatic substance such as iodine. As a solvent to be used for a solution of the coloring bath, water is generally used, but an appropriate amount of an organic solvent having compatibility with water may be added. The dichromatic substance is typically used in a ratio of 0.1 to 1.0 part by weight with respect to 100 parts by weight of the solvent. In the case where iodine is used as a dichromatic substance, the solution of the coloring bath preferably further contains an assistant such as an iodide for improving a coloring efficiency. The assistant is used in a ratio of preferably 0.02 to 20 parts by weight, and more preferably 2 to 10 parts by weight with respect to 100 parts by weight of the solvent. Specific examples of the iodide include potassium iodide, lithium iodide, sodium iodide, zinc iodide, aluminum iodide, lead iodide, copper iodide, barium iodide, calcium iodide, tin iodide, and titanium iodide. The temperature of the coloring bath is typically about 20 to 70° C., and the immersion time in the coloring bath is typically about 1 to 20 minutes.

The cross-linking step is typically conducted by immersing in a treatment bath (cross-linking bath) containing a cross-linking agent the polyvinyl alcohol-based resin film that has undergone the coloring treatment. The cross-linking agent employed may be any appropriate cross-linking agent. Specific examples of the cross-linking agent include: a boron compound such as boric acid or borax; glyoxal; and glutaraldehyde. The cross-linking agent may be used alone or in combination. As a solvent to be used for a solution of the cross-linking bath, water is generally used, but an appropriate amount of an organic solvent having compatibility with water may be added. The cross-linking agent is typically used in a ratio of 1 to 10 parts by weight with respect to 100 parts by weight of the solvent. In the case where a concentration of the cross-linking agent is less than 1 part by weight, sufficient optical properties are often not obtained. In the case where the concentration of the cross-linking agent is more than 10 parts by weight, stretching force to be generated on the film during stretching increases and a polarizing plate to be obtained may shrink. The solution of the cross-linking bath preferably further contains an assistant such as an iodide for obtaining uniform properties in the same plane. The concentration of the assistant is preferably 0.05 to 15 wt %, and more preferably 0.5 to 8 wt %. Specific examples of the iodide are the same as in the case of the coloring step. The temperature of the cross-linking bath is typically about 20 to 70° C., and preferably 40 to 60° C. The immersion time in the cross-linking bath is typically about 1 second to 15 minutes, and preferably 5 seconds to 10 minutes.

The stretching step may be conducted at any stage as described above. Specifically, the stretching step may be conducted after the coloring treatment, before the coloring treatment, at the same time as the swelling treatment, the coloring treatment, and the cross-linking treatment, or after the cross-linking treatment. A cumulative stretching ratio of the polyvinyl alcohol-based resin film must be 5 times or more, preferably 5 to 7 times, and more preferably 5 to 6.5 times. In the case where the cumulative stretching ratio is less than 5 times, a polarizing plate having a high degree of polarization may be hard to obtain. In the case where the cumulative stretching ratio is more than 7 times, the polyvinyl alcohol-based resin film (polarizer) may easily break. A specific method of stretching employed may be any appropriate method. For example, in the case where a wet stretching method is employed, a polyvinyl alcohol-based resin film is stretched in a treatment bath (stretching bath) to a predetermined ratio. A solution of the stretching bath to be preferably used is a solution in which various metal salts or compounds of iodine, boron, or zinc are added to a solvent such as water or an organic solvent (such as ethanol).

The water washing step is typically conduced by immersing in a treatment bath (water washing bath) the polyvinyl alcohol-based resin film that has undergone the various treatments. The water washing step allows washing away of unnecessary remains from the polyvinyl alcohol-based resin film. The water washing bath may contain pure water or an aqueous solution containing iodide (such as potassium iodide or sodium iodide). The concentration of an aqueous iodide solution is preferably 0.1 to 10% by weight. The aqueous iodide solution may contain an assistant such as zinc sulfate or zinc chloride. The temperature of the water washing bath is preferably 10 to 60° C., and more preferably 30 to 40° C., and the immersion time is typically 1 second to 1 minute. The water washing step may be conducted only once, or may be conducted a plurality of times as required. In the case where the water washing step is conducted a plurality of times, the kind and concentration of the additive contained in the water washing bath to be used for each treatment may appropriately be adjusted. For example, the water washing step includes a step of immersing a polymer film in an aqueous potassium iodide solution (0.1 to 10% by weight, 10 to 60° C.) for 1 second to 1 minute and a step of washing the polymer film with pure water.

The drying step may employ any appropriate drying method (such as natural drying, air drying, or heat drying). For example, in heat drying, a drying temperature is typically 20 to 80° C., and a drying time is typically 1 to 10 minutes. In such a manner as described above, the polarizer is obtained.

The polarizing plate of the present invention includes the polarizer and the polarizer protective film of the present invention, and preferably includes an easy adhesion layer and an adhesive layer between the polarizer protective film and the polarizer.

The adhesive layer is preferably a layer formed of a polyvinyl alcohol-based adhesive. The polyvinyl alcohol-based adhesive contains a polyvinyl alcohol-based resin and a cross-linking agent.

Examples of the above-mentioned polyvinyl alcohol-based resin include without particular limitation: a polyvinyl alcohol obtained by saponifying polyvinyl acetate; derivatives thereof; a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft polymer, phosphate, or the like. Examples of the monomer include: unsaturated carboxylic acids such as maleic acid (anhydrides), fumaric acid, crotonic acid, itaconic acid, and (meth)acrylic acid and esters thereof; α-olefin such as ethylene and propylene; (sodium) (meth) allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. The polyvinyl alcohol-based resins may be used alone or in combination.

The polyvinyl alcohol-based resin has an average degree of polymerization of preferably 100 to 3,000, and more preferably 500 to 3,000, and an average degree of saponification of preferably 85 to 100 mol %, and more preferably 90 to 100 mol %.

A polyvinyl alcohol-based resin having an acetoacetyl group may be used as the above-mentioned polyvinyl alcohol-based resin. The polyvinyl alcohol-based resin having an acetoacetyl group is a polyvinyl alcohol-based adhesive having a highly reactive functional group and is preferred from the viewpoint of improving durability of a polarizing plate.

The polyvinyl alcohol-based resin having an acetoacetyl group is obtained in a reaction between the polyvinyl alcohol-based resin and diketene through a known method. Examples of the known method include: a method involving dispersing the polyvinyl alcohol-based resin in a solvent such as acetic acid, and adding diketene thereto; and a method involving dissolving the polyvinyl alcohol-based resin in a solvent such as dimethylformamide or dioxane, in advance, and adding diketene thereto. Another example of the known method is a method involving directly bringing diketene gas or a liquid diketene into contact with polyvinyl alcohol.

A degree of acetoacetyl modification of the polyvinyl alcohol-based resin having an acetoacetyl group is not particularly limited as long as it is 0.1 mol % or more. A degree of acetoacetyl modification of less than 0.1 mol % provides insufficient water resistance with the adhesive layer and is inappropriate. The degree of acetoacetyl modification is preferably 0.1 to 40 mol %, and more preferably 1 to 20 mol %. A degree of acetoacetyl modification of more than 40 mol % decreases the number of reaction sites with a cross-linking agent and provides a small effect of improving the water resistance. The degree of acetoacetyl modification is a value measured by NMR.

As the above-mentioned cross-linking agent, the one used for a polyvinyl alcohol-based adhesive can be used without particular limitation. A compound having at least two functional groups each having reactivity with a polyvinyl alcohol-based resin can be used as the cross-linking agent. Examples of the compound include: alkylene diamines having an alkylene group and two amino groups such as ethylene diamine, triethylene amine, and hexamethylene diamine (of those, hexamethylene diamine is preferred); isocyanates such as tolylene diisocyanate, hydrogenated tolylene diisocyanate, a trimethylene propane tolylene diisocyanate adduct, triphenylmethane triisocyanate, methylene bis(4-phenylmethane-triisocyanate, isophorone diisocyanate, and ketoxime blocked compounds and phenol blocked compounds thereof; epoxies such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylol urea, methylol melamine, alkylated methylol urea, alkylated methylol melamine, acetoguanamine, or benzoguanamine; and salts of divalent or trivalent metals such as sodium, potassium, magnesium, calcium, aluminum, iron, and nickel and oxides thereof. A melamine-based cross-linking agent is preferred as the cross-linking agent, and methylolmelamine is particularly preferred.

A mixing amount of the cross-linking agent is preferably 0.1 to 35 parts by weight, and more preferably 10 to 25 parts by weight with respect to 100 parts by weight of the polyvinyl alcohol-based resin. Meanwhile, for improving the durability, the cross-linking agent may be mixed within a range of more than 30 parts by weight and 46 parts by weight or less with respect to 100 parts by weight of the polyvinyl alcohol-based resin. In particular, in the case where the polyvinyl alcohol-based resin having an acetoacetyl group is used, the cross-linking agent is preferably used in an amount of more than 30 parts by weight. The cross-linking agent is mixed within a range of more than 30 parts by weight and 46 parts by weight or less, to thereby improve the water resistance.

The above-mentioned polyvinyl alcohol-based adhesive can also contain a coupling agent such as a silane coupling agent or a titanium coupling agent, various kinds of tackifiers, a UV absorber, an antioxidant, a stabilizer such as a heat-resistant stabilizer or a hydrolysis-resistant stabilizer.

In the polarizer protective film of the present invention, the surface which comes into contact with a polarizer can be subjected to easy adhesion treatment for the purpose of enhancing the adhesive property. Examples of the easy adhesion treatment include surface treatment such as corona treatment, plasma treatment, low-pressure UV treatment, and saponification. The easy adhesion layer (anchor layer) is preferably formed after the easy adhesion treatment is performed.

The polarizer protective film of the present invention has a (meth)acrylic resin having a lactone ring structure and being capable of expressing high heat resistance, high transparency, and high mechanical strength, and has core-shell type nanoparticles with a particular structure. Therefore, even when the surface of the film is subjected to an easy adhesion treatment (for example, a corona treatment) so as to enhance the adhesion with respect to a polarizer, cohesive failure can be prevented from occurring in the vicinity of the surface of the film, and as a result, the excellent effect capable of realizing the satisfactory adhesion with respect to a polarizer and a polarizer protective film can be exhibited while high heat resistance, high transparency, and high mechanical strength are maintained.

As the above-mentioned easy adhesion layer, for example, there is a silicone layer having a reactive functional group. Examples of a material for the silicone layer having a reactive functional group are not particularly limited but include alkoxysilanols containing an isocyanate group, alkoxysilanols containing an amino group, alkoxysilanols containing a mercapto group, alkoxysilanols containing carboxyl, alkoxysilanols containing an epoxy group, alkoxysilanols containing a vinyl-type unsaturated group, alkoxysilanols containing a halogen group, and alkoxysilanols containing an isocyanate group, and amino-based silanol is preferred. Further, by adding a titanium-based catalyst or a tin-based catalyst for allowing the above-mentioned silanol to be reacted efficiently, the adhesive strength can be enhanced. Further, other additives may be added to the above-mentioned silicone containing a reactive functional group. Specifically, further, a tackifier such as a terpene resin, a phenol resin, a terpene-phenol resin, a rosin resin, or a xylene resin, a UV absorber, an antioxidant, a stabilizer such as a heat-resistant stabilizer may be used.

The above-mentioned silicone layer having a reactive functional group is formed by coating and drying by a known technology. The thickness of the silicone layer after drying is preferably 1 to 100 nm and more preferably 10 to 50 nm. During coating, silicone having a reactive functional group may be diluted with a solvent. An example of a dilution solvent is not particularly limited but includes alcohols. The dilution concentration is not particularly limited but is preferably 1 to 5% by weight, and more preferably 1 to 3% by weight.

The above-mentioned adhesive layer is formed by applying the above-mentioned adhesive on either side or both sides of a polarizer protective film, and on either side or both sides of a polarizer. After the polarizer protective film and the polarizer are attached to each other, a drying step is performed, to thereby form an adhesive layer made of an applied dry layer. After the adhesive layer is formed, the polarizer and the polarizer protective film may also be attached to each other. The polarizer and the polarizer protective film are attached to each other with a roll laminator or the like. The heat-drying temperature and the drying time are appropriately determined depending upon the kind of an adhesive.

Too large thickness of the adhesive layer after drying is not preferred in view of the adhesive property of the polarizer protective film. Therefore, the thickness of the adhesive layer is preferably to 10 μm, and more preferably 0.03 to 5 μm.

The attachment of the polarizer protective film to the polarizer can be performed by bonding one side of the polarizer protective film on both sides of the polarizer.

Further, the attachment of the polarizer protective film to the polarizer can be performed by bonding one side of the polarizer protective film to one surface of the polarizer and attaching a cellulose-based resin to the other surface of the polarizer.

The cellulose-based resin is not particularly limited. However, triacetyl cellulose is preferred in terms of transparency and an adhesive property. The thickness of the cellulose-based resin is preferably 30 to 100 μm, and more preferably 40 to 80 μm. When the thickness is smaller than 30 μm, the film strength decreases to degrade workability, and when the thickness is larger than 100 μm, the light transmittance decreases remarkably in terms of durability.

The polarizing plate according to the present invention may have a pressure-sensitive adhesive layer as at least one of an outermost layer (such a polarizing plate may be referred to as polarizing plate of a pressure-sensitive adhesion type). As a particularly preferred embodiment, a pressure-sensitive adhesive layer for bonding of other members such as another optical film and a liquid crystal cell can be provided to an opposite side of the polarizer of the above-mentioned polarizer protective film.

The pressure-sensitive adhesive forming the above-mentioned pressure-sensitive adhesive layer is not particularly limited. However, for example, a pressure-sensitive adhesive containing as a base polymer an acrylic polymer, a silicone-based polymer, polyester, polyurethane, polyamide, polyether, a fluorine or rubber-based polymer can be appropriately selected to be used. In particular, a pressure-sensitive adhesive such as an acrylic pressure-sensitive adhesive is preferably used, which is excellent in optical transparency, exhibits appropriate wettability and pressure-sensitive adhesion properties of a cohesive property and an adhesive property, and is excellent in weather resistance and heat resistance. In particular, an acrylic pressure-sensitive adhesive made of an acrylic polymer containing 4 to 12 carbon atoms is preferred.

In addition to the above, in terms of the prevention of a foaming phenomenon and a peeling phenomenon caused by moisture absorption, the prevention of a degradation in optical properties and bending of a liquid crystal cell caused by thermal expansion difference or the like, and the formation property of a liquid crystal display apparatus which is of high quality and has excellent durability, a pressure-sensitive adhesive layer having a low moisture absorbing ratio and excellent heat resistance is preferred.

The above-mentioned pressure-sensitive adhesive layer may contain, for example, resins of a natural substance or a synthetic substance, in particular, additives to be added to the pressure-sensitive adhesive layer, a tackifying resin, a filler such as glass fibers, glass beads, metal powder, or other inorganic powders, a pigment, a colorant, and an antioxidant.

A pressure-sensitive adhesive layer that contains fine particles and exhibits a light diffusion property or the like may be used.

The above-mentioned pressure-sensitive adhesive layer can be provided by any appropriate method. Examples thereof include a method of preparing a pressure-sensitive adhesive solution in an amount of about 10 to 40% by weight in which a base polymer or a composition thereof is dissolved or dispersed in any appropriate single solvent such as toluene or ethyl acetate or a solvent made of a mixture, and directly applying the pressure-sensitive adhesive solution onto a polarizing plate or an optical film by any appropriate development method such as a flow casting method or a coating method, or forming a pressure-sensitive adhesive layer on a separator according to the above, and moving the pressure-sensitive adhesive layer to the polarizer protective film surface.

The pressure-sensitive adhesive layer may also be provided on one surface or both surfaces of a polarizing plate as superimposed layers of different compositions, different kinds, or the like. In the case of providing the pressure-sensitive adhesive layer on both surfaces of the polarizing plate, pressure-sensitive adhesive layers on front and reverse surfaces of the polarizing plate can have different compositions, kinds, thicknesses, and the like.

The thickness of the pressure-sensitive adhesive layer can be determined appropriately in accordance with the use purpose and the adhesive strength, and preferably 1 to 40 µm, more preferably 5 to 30 µm, and particularly preferably 10 to 25 µm. When the thickness of the pressure-sensitive adhesive layer is smaller than 1 µm, durability of the layer degrades. When the thickness of the pressure-sensitive adhesive layer is larger than 40 µm, lifting and peeling are likely to occur due to foaming or the like, resulting in an unsatisfactory outer appearance.

In order to enhance the contactness between the above-mentioned polarizer protective film and the above-mentioned pressure-sensitive adhesive layer, an anchor layer can also be provided therebetween.

As the anchor layer, preferably, an anchor layer selected from polyurethane, polyester, and polymers containing amino groups in molecules is used, and in particular, polymers containing amino groups in molecules are preferably used. In the polymer containing an amino group in molecules, an amino group in the molecules reacts with a carboxyl group in the pressure-sensitive adhesive or a polar group in a conductive polymer, or exhibits an interaction such as an ion interaction, so satisfactory contactness is ensured.

Examples of the polymers containing amino groups in molecules include polyethyleneimine, polyallylamine, polyvinylamine, polyvinylpyridine, polyvinylpyrrolidine, and a polymer of an amino group-containing monomer such as dimethylaminoethyl acrylate shown in the above-mentioned copolymerized monomer of the acrylic pressure-sensitive adhesive.

In order to provide the above-mentioned anchor layer with an antistatic property, an antistatic agent can also be added. Examples of the antistatic agent for providing an antistatic property include an ionic surfactant, a conductive polymer such as polyaniline, polythiophene, polypyrrole, and polyquinoxaline, and a metal oxide such as tin oxide, antimony oxide, and indium oxide. Particularly, in view of optical properties, an outer appearance, an antistatic effect, and stability of an antistatic effect under heat or humidity, the conductive polymers are used preferably. Of those, a water-soluble conductive polymer such as polyaniline and polythiophene, or a water-dispersion conductive polymer is particularly preferably used. The reason for this is as follows: in the case of using a water-soluble conductive polymer or a water-dispersion conductive polymer as a material for forming an antistatic layer, the deterioration of an optical film base caused by an organic solvent can be suppressed in the process of coating.

In the present invention, each layer of a polarizer and a polarizer protective film forming the above-mentioned polarizing plate, and the pressure-sensitive adhesive layer may be provided with a UV absorbing ability, for example, by the treatment with a UV absorbing agent such as a salicylateester-based compound, a benzophenol-based compound, benzot-riazol-based compound, a cyanoacrylate-based compound, and a nickel complex salt-based compound.

The polarizing plate of the present invention may be provided on either one of a viewer side and a backlight side of a liquid crystal cell or on both sides thereof without particular limitation.

Figure 2:
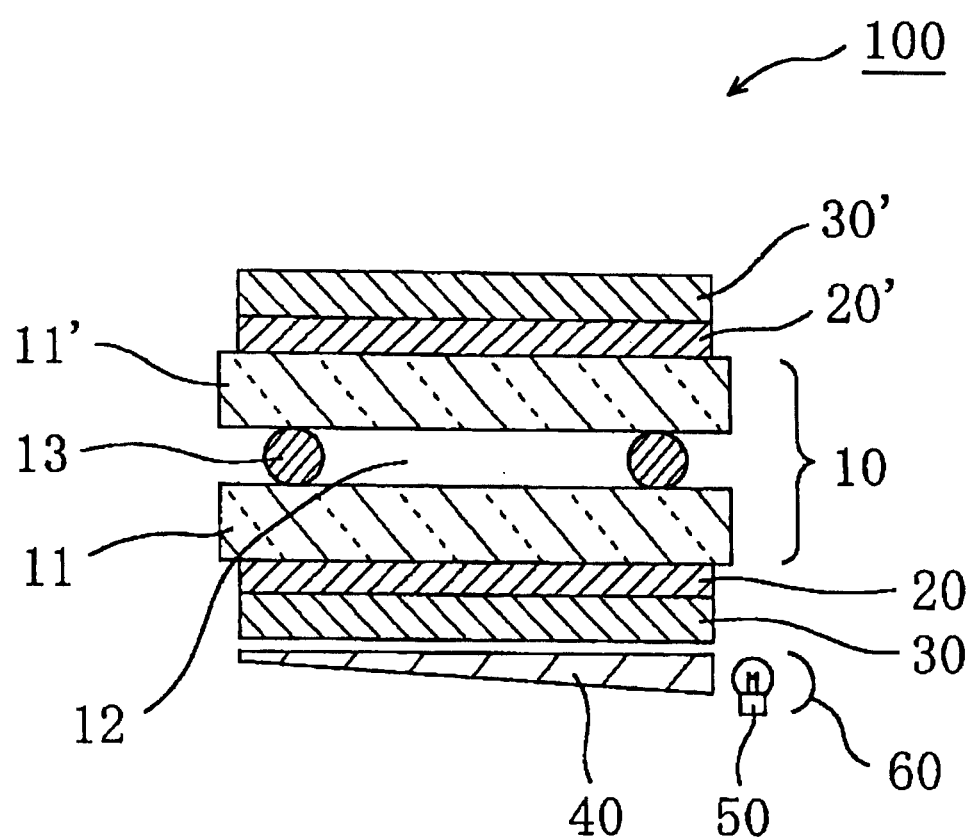
[FIG. 2] A schematic cross-sectional view of a liquid crystal display apparatus according to a preferred embodiment of the present invention.

Next, an image display apparatus of the present invention will be described. The image display apparatus of the present invention includes at least one polarizing plate of the present invention. Herein, as one example, a liquid crystal display apparatus will be described. However, it is needless to say that the present invention is applicable to any display apparatus requiring a polarizing plate. Specific examples of the image display apparatus to which the polarizing plate of the present invention is applicable include a self-emitting display apparatus such as an electroluminescence (EL) display, a plasma display (PD), and a field emission display (FED). FIG. 2 is a schematic cross-sectional view of a liquid crystal display apparatus according to a preferred embodiment of the present invention. In the illustrated example, a transmission-type liquid crystal display apparatus will be described. However, it is needless to say that the present invention is also applicable to a reflection-type liquid crystal display apparatus or the like.

A liquid crystal display apparatus 100 includes a liquid crystal cell 10, retardation films 20 and 20' placed so as to interpose the liquid crystal cell 10 therebetween, polarizing plates 30 and 30' placed on outer sides of the retardation films 20 and 20', a light guide plate 40, a light source 50, and a reflector 60. The polarizing plates 30 and 30' are placed so that polarization axes thereof are perpendicular to each other. The liquid crystal cell 10 includes a pair of glass substrates 11 and 11' and a liquid crystal layer 12 as a display medium placed between the substrates. One glass substrate 11 is provided with a switching element (typically, TFT) for controlling the electrooptical properties of liquid crystals, a scanning line for providing a gate signal to the switching element, and a signal line for providing a source signal to the switching element (all of them are not shown). The other glass substrate 11' is provided with a color layer forming a color filter and a shielding layer (black matrix layer) (both of them are not shown). A distance (cell gap) between the glass substrates 11 and 11' is controlled by a spacer 13. In the liquid crystal display apparatus of the present invention, the polarizing plate of the present invention described above is employed as at least one of the polarizing plates 30 and 30'.

For example, in the case of the liquid crystal display apparatus 100 employing a TN mode, liquid crystal molecules of the liquid crystal layer 12 are aligned in a state with respective polarization axes being shifted by 90° during application of no voltage. In such a state, injected light including light in one direction transmitted through the polarizing plate is twisted 90° by the liquid crystal molecules. As described above, the polarizing plates are arranged such that the respective polarization axes are perpendicular to each other, and thus light (polarized light) reaching the other polarizing plate transmits through the polarizing plate. Thus, during application of no voltage, the liquid crystal display apparatus 100 provides a white display (normally white mode). Meanwhile, in the case where a voltage is applied onto the liquid crystal display apparatus 100, alignment of the liquid crystal molecules in the liquid crystal layer 12 changes. As a result, the light (polarized light) reaching the other polarizing plate cannot transmit through the polarizing plate, and a black display is provided. Displays are switched as described above by pixel by using the active element, to thereby form an image.

EXAMPLES

Hereinafter, the present invention will be described specifically with reference to Examples, but the present invention is not limited to Examples. Note that, unless otherwise noted, parts and % in Examples are based on weight. Evaluation was performed as follows.

<Mass Average Molecular Weight>

The mass average molecular weight was measured by polystyrene calibration, using Shodex GPC system-21H manufactured by Showa Denko K.K.

<Tg (Glass Transition Temperature, which May be Referred to as Tg>

A polymer was once dissolved in tetrahydrofuran, and the resultant solution was placed in excessive hexane or toluene, followed by reprecipitation and filtration. The precipitate thus obtained was subjected to drying under reduced pressure (80° C./1 mmHg (1.33 hPa), 3 or more hours), to thereby remove a volatile constituent. The obtained resin was measured for a Tg, using a DSC apparatus (DSC 8230 manufactured by Rigaku Co., Ltd.).

<Content Rate of Lactone Ring Structure Unit>

First, the dealcoholization reaction rate was obtained from the weight reduction caused by a dealcoholization reaction from 150° C., which is prior to the starting of the weight reduction, to 300° C., which is prior to the starting of the decomposition of a polymer, by dynamic TG measurement, based on the weight reduction amount occurring at a time when all the hydroxyl groups are dealcoholized as methanol from a polymer composition obtained in polymerization.

That is, the weight reduction rate from 150° C. to 300° C. by the dynamic TG measurement of a polymer having a lactone ring structure is measured, and the obtained measured weight reduction rate is defined as (X). On the other hand, the theoretical weight reduction rate (i.e., the weight reduction rate calculated assuming that 100% dealcoholization occurred on the composition) assuming that all the hydroxyl groups contained in the polymer composition participate in the formation of a lactone ring to become alcohol, resulting in dealcoholization, from the polymer composition, is defined as (Y). More specifically, the theoretical weight reduction rate (Y) can be calculated from a molar ratio of a material monomer having a structure (hydroxyl group) participating in a dealcoholization reaction in a polymer, that is, the content of the material monomer in the polymer composition. Those values (X, Y) are substituted into a dealcoholization calculation expression: 1−(measured weight reduction rate (X)/theoretical weight reduction rate (Y)), and the obtained value is expressed by %, to thereby obtain a dealcoholization reaction rate.

As an example, the ratio of the lactone ring structure occupying in pellets obtained in Production Example 3 described later is calculated. When a theoretic weight reduction rate (Y) of the polymer is obtained, the molecular weight of methanol is 32, the molecular weight of methyl 2-(hydroxymethyl)acrylate is 116, and the content (weight ratio) of methyl 2-(hydroxymethyl) acrylate in the polymer is 20% by weight in terms of composition, so that the result comes to $(32/116) \times 20 \approx 5.52$ by weight. On the other hand, a measured weight reduction rate (X) by dynamic TG measurement is 0.18% by weight. If these values are substituted into the dealcoholization calculation expression, the result comes to $1-(0.18/5.52) \approx 0.967$. Therefore, the dealcoholization reaction rate is 96.7% by weight.

Then, assuming that predetermined lactone cyclization is effected by the dealcoholization reaction rate, the content (weight ratio) of a material monomer having a structure (hydroxyl group) involving in lactone cyclization in the copolymer composition is multiplied by the dealcoholization reaction rate to be converted into a content (weight ratio) of a structure of a lactone ring unit, whereby the content ratio of a lactone ring structure in the copolymer can be calculated. In the case of Production Example 3, the content of methyl 2-(hydroxymethyl)acrylate in the copolymer is 20.0% by weight, the calculated dealcoholization reaction rate is 96.7% by weight, and the formula weight of a lactone cyclization structure unit generated in the case where methyl 2-(hydroxymethyl)acrylate with a molecular weight of 116 is condensed with methyl methacrylate is 170, so that the content ratio of a lactone ring in the copolymer is 28.3% by weight $((20.0 \times 0.967 \times 170/116)$ % by weight).

<Melt Flow Rate>

The melt flow rate was measured at a test temperature of 240° C. and a load of 10 kg based on JIS-K6874.

<Total Light Transparency>

A produced protective film sample was cut to a piece of 3 cm per side, and a total light transparency was measured by "UV-VIS-NIR-SPECTROMETER UV3150" manufactured by Shimadzu Corporation.

<Haze>

A haze was measured using a haze meter (HM-150 manufactured by Murakami Color Research Laboratory Instruments) in accordance with JIS K 7136 (method of obtaining a haze of a plastic-transparent material).

<Adhesion Property Between a Polarizer Protective Film and a Polarizer>

The state in which a polarizing plate (100 mm×100 mm) was twisted with the hand was evaluated based on the following standards.

o: The polarizer and the polarizer protective film are integrated with each other and do not peel from each other.

Δ: Peeling is recognized in the polarizer and the polarizer protective film and at an end.

x: Peeling is recognized between the polarizer and the polarizer protective film.

<Outer Appearance of a Polarizing Plate>

The outer appearance of the obtained polarizing plate was evaluated. The evaluation was conducted with respect to a polarizing plate of 50 mm×50 mm by visual inspection based on the following standards.

o: There are no lifting, streaks, and the like.

x: No lifting and streaks are found.

The lifting refers to the state in which the polarizer and the polarizer protective film do not tightly contact with each other, and the streak means that the polarizer protective film or the polarizer is bonded by itself even if in a small area.

Production Example 1

Production of Polarizer

A polyvinyl alcohol film with a thickness of 80 μm was dyed in a 5% by weight of an iodine aqueous solution (weight ratio: iodine/potassium iodide=1/10). Then, the resultant polyvinyl alcohol film was soaked in an aqueous solution containing 3% by weight of boric acid and 2% by weight of potassium iodide. Further, the polyvinyl alcohol film was stretched by 5.5 times in an aqueous solution containing 4% by weight of boric acid and 3% by weight of potassium iodide, and thereafter, the polyvinyl alcohol film was soaked in a 5% by weight of a potassium iodide aqueous solution. After that, the polyvinyl alcohol film was dried in an oven at 40° C. for 3 minutes to obtain a polarizer with a thickness of 30 μm.

Production Example 2

Production of a Lactone Ring-Containing Acrylic Resin (1A)

In a 30-L reaction vessel equipped with a stirring device, a temperature sensor, a condenser, and a nitrogen introduction pipe, 9,000 g of methyl methacrylate (MMA), 1,000 g of methyl 2-(hydroxymethyl)acrylate (MHMA), and 10,000 g of 4-methyl-2-pentanone (methyl isobutyl ketone, MIBK), and 50 g of n-dodecylmercaptan were placed, and the mixture was heated to 105° C. while nitrogen was being introduced thereto. After reflux, while 5.0 g of tert-buthylperoxy isopropylcarbonate (KAYACARBON BIC-75 (Trade name) manufactured by KAYAKU AKZO CO., LTD.) was added as an initiator, and at the same time, a solution containing 10.0 g of tert-buthylperoxy isopropylcarbonate and 230 g of MIBK were dropped over 4 hours, the mixture was subjected to solution polymerization under reflux (about 105 to 120° C.), and further aged over 4 hours.

To the resultant polymer solution, 30 g of a stearyl phosphate/distearyl phosphate mixture (Phoslex A-18 (Trade name) manufactured by Sakai Chemical Industry Co., Ltd.) was added, and the polymer solution was subjected to cyclization condensation reaction under reflux (about 90 to 120° C.) for 5 hours. Then, the polymer solution obtained in the above cyclization condensation reaction was introduced to a bent-type screw biaxial extruder (Φ=29.75 mm, L/D=30) of a barrel temperature of 260° C., a rotation number of 100 rpm, a decompression degree of 13.3 to 400 hPa (10 to 300 mmHg), one rear bent, and four fore bents, at a processing speed of 2.0 kg/hour in resin amount conversion. The polymer solution was subjected to cyclization condensation reaction and devolatilization in the extruder and extruded, to thereby obtain a transparent lactone ring-containing acrylic resin pellet (1A).

The lactone cyclization ratio of the lactone ring-containing acrylic resin pellet (1A) was 96.7%, the mass average molecular weight thereof was 146,000, the melt flow rate thereof was 7.1 g/10 minutes, and the Tg (glass transition temperature) thereof was 124° C.

Production Example 3

Production of a Lactone Ring-Containing Acrylic Resin (1B)

In a 30-L reaction vessel equipped with a stirring device, a temperature sensor, a condenser, and a nitrogen introduction pipe, 8,000 g of methyl methacrylate (MMA), 2,000 g of methyl 2-(hydroxymethyl)acrylate (MHMA), and 10,000 g of toluene were placed, and the mixture was heated to 105° C. while nitrogen was being introduced thereto. After reflux, while 10.0 g of tert-amylperoxy isononanoate (Lupasol 570 (Trade name) manufactured by ARKEMA YOSHITOMI LTD.) was added as an initiator, and at the same time, a solution containing 20.0 g of the initiator and 100 g of toluene were dropped over 4 hours, the mixture was subjected to solution polymerization under reflux (about 105 to 110° C.), and further aged over 4 hours.

To the resultant polymer solution, 10 g of a stearyl phosphate/distearyl phosphate mixture (Phoslex A-18 (Trade name) manufactured by Sakai Chemical Industry Co., Ltd.) was added, and the polymer solution was subjected to cyclization condensation reaction under reflux (about 90 to 110° C.) for 5 hours. Then, the polymer solution obtained in the above cyclization condensation reaction was introduced to a bent-type screw biaxial extruder (Φ=29.75 mm, L/D=30) of a barrel temperature of 260° C., a rotation number of 100 rpm, a decompression degree of 13.3 to 400 hPa (10 to 300 mmHg), one rear bent, and four fore bents, at a processing speed of 2.0 kg/hour in resin amount conversion. The polymer solution was subjected to cyclization condensation reaction and devolatilization in the extruder and extruded, to thereby obtain a transparent lactone ring-containing acrylic resin pellet (1B).

The lactone cyclization ratio of the lactone ring-containing acrylic resin pellet (1B) was 96.7%, the mass average molecular weight thereof was 147,700, the melt flow rate thereof was 11.0 g/10 minutes, and the Tg (glass transition temperature) thereof was 130° C.

Example 1

(Production of a Polarizer Protective Film)

5 parts of STAFILOID IM-701 (core-shell type nanoparticles with a core layer being a rubber polymer and a shell layer being a glass polymer) manufactured by Ganz Chemical Co., Ltd. were mixed with 100 parts of pellets (1A) of a lactone ring-containing acrylic resin. The mixture was extruded from a T-die at a dice temperature of 260° C. by a single axis extruder to obtain a 120 μm film. This film was stretched by 2.0 times at 140° C. in a longitudinal direction and stretched by 2.0 times at 140° C. in a lateral direction, whereby a film with a thickness of 60 μm was obtained. After that, one surface of the film was subjected to a corona treatment at a discharge amount of 70 w·min/m².

(Formation of Easy Adhesion Layer)

A solution prepared by adding 66.7 parts of isopropyl alcohol with respect to 100 parts of a silane coupling agent APZ-6601 (manufactured by Toray Dow Corning Silicone Co., Ltd.) was applied onto a corona treated surface of the film obtained in the above with a wire bar #5 to evaporate a volatile content.

(Preparation of Adhesive Aqueous Solution)

An aqueous solution of a polyvinyl alcohol-based adhesive was prepared by adding an aqueous solution containing 20 parts by weight of methylol melamine with respect to 100 parts by weight of a polyvinyl alcohol resin with an acetoacetyl group denatured (acetylation degree: 13%) so as to be a concentration of 0.5% by weight.

(Production of a Polarizing Plate)

The surface of an easy adhesion layer of the polarizer protective film was attached to one surface of a polarizer, and saponified triacetylcellulose (T-40UZ (Trade name) manufactured by Fuji Photo Film Co., Ltd.) was attached to the other surface of the polarizer, using an aqueous solution of a polyvinyl alcohol-based adhesive prepared as described above. The aqueous solution of a polyvinyl alcohol-based adhesive was applied to the easy adhesion layer surface side of the polarizer protective film and the triacetylcellulose side, followed by drying at 70° C. for 10 minutes, whereby a polarizing plate was obtained.

(Formation of Pressure-Sensitive Adhesive Layer)

As a base polymer, a solution (solid content: 30%) containing an acrylic polymer with a weight average molecular weight of 2,000,000 made of a copolymer of butyl acrylate: acrylic acid:2-hydroxyethyl acrylate=100:5:0.1 (weight ratio) was used. To the acrylic polymer solution, 4 parts of COLONATE L manufactured by Nippon Polyurethane Co., Ltd., which was an isocyanate-based polyfunctional compound, 0.5 parts of an additive (KBM 403 manufactured by Shin-Etsu Silicones), and a solvent (ethyl acetate) for adjusting the viscosity were added with respect to 100 parts of a polymer solid content, to thereby prepare the pressure-sensitive adhesive solution (solid content: 12%). The pressure-sensitive adhesive solution was applied onto a releasing film (polyethylene terephthalate base: Dia Foil MRF38 manufactured by Mitsubishi Polyester Film Corporation), followed by drying in a hot-air circulation type oven, to thereby form a pressure-sensitive adhesive layer.

(Polarizing Plate Anchor Layer)

A polyethyleneimine adduct of polyacrylic ester (Polyment NK380 (Trade name) manufactured by Nippon Shokubai Co., Ltd.) was diluted 50-fold with methylisobutylketone. The resultant polyethyleneimine adduct was applied onto one side of the polarizing plate using a wire bar (#5) so that the thickness after drying was 50 nm, followed by drying.

(Production of a Pressure-Sensitive Adhesion Type Polarizing Plate)

A releasing film with the above-mentioned pressure-sensitive adhesive layer formed thereon was attached to the polarizing plate anchor layer, to thereby produce a pressure-sensitive adhesion type polarizing plate.

(Evaluation of a Polarizer Protective Film)

The obtained polarizer protective films were measured for a total light transparency and a haze. Table 1 shows the results.

(Evaluation of a Polarizing Plate)

The adhesion and external appearance of polarizer protective films and polarizers of the obtained polarizing plates were evaluated. Table 2 shows the results.

Example 2

Example 2 was performed in the same way as in Example 1, except that 20 parts of STAFILOID IM-701 (core-shell type nanoparticles) manufactured by Ganz Chemical Co., Ltd. were mixed with 100 parts of pellets (1A) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

Example 3

Example 3 was performed in the same way as in Example 1, except that 30 parts of STAFILOID IM-701 (core-shell type nanoparticles) manufactured by Ganz Chemical Co., Ltd. were mixed with 100 parts of pellets (1A) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

Example 4

Example 4 was performed in the same way as in Example 1, except that 5 parts of STAFILOID IM-701 (core-shell type nanoparticles) manufactured by Ganz Chemical Co., Ltd. were mixed with 100 parts of pellets (1B) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

Example 5

Example 5 was performed in the same way as in Example 1, except that 20 parts of STAFILOID IM-701 (core-shell type nanoparticles) manufactured by Ganz Chemical Co., Ltd. were mixed with 100 parts of pellets (1B) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

Example 6

Example 6 was performed in the same way as in Example 1, except that 30 parts of STAFILOID IM-701 (core-shell type nanoparticles) manufactured by Ganz Chemical Co., Ltd. were mixed with 100 parts of pellets (1B) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

[Comparative Example 1]

Comparative Example 1 was performed in the same way as in Example 1, except that STAFILOID IM-701 (core-shell type nanoparticles) manufactured by Ganz Chemical Co., Ltd. was not mixed with 100 parts of pellets (1A) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

[Comparative Example 2]

Comparative Example 2 was performed in the same way as in Example 1, except that STAFILOID IM-701 (core-shell type nanoparticles) manufactured by Ganz Chemical Co., Ltd. was not mixed with 100 parts of pellets (1B) of a lactone ring-containing acrylic resin.

The obtained polarizer protective films were measured for a total light transparency and a haze. Table 1 shows the results.

The adhesion and external appearance of polarizer protective films and polarizers of the obtained polarizing plates were evaluated. Table 2 shows the results.

TABLE 1

| | Example 1 | Example 2 | Example 3 | Comparative Example 1 | Example 4 | Example 5 | Example 6 | Comparative Example 2 |
| --- | --- | --- | --- | --- | --- | --- | --- | --- |
| Lactone ring-containing acrylic | (1A) | (1A) | (1A) | (1A) | (1B) | (1B) | (1B) | (1B) |

TABLE 1-continued

| | Example 1 | Example 2 | Example 3 | Comparative Example 1 | Example 4 | Example 5 | Example 6 | Comparative Example 2 |
|---|---|---|---|---|---|---|---|---|
| resin | | | | | | | | |
| Core-shell type nanoparticles (parts by weight: with respect to 100 parts by weight of (1A) or (1B)) | 5 | 20 | 30 | 0 | 5 | 20 | 30 | 0 |
| Total light transparency (%) | 92.3 | 92.6 | 92.5 | 92.4 | 92.5 | 92.2 | 92.5 | 92.4 |
| Haze (%) | 0.8 | 1.4 | 3.0 | 0.5 | 2.9 | 3.9 | 3.1 | 0.3 |

TABLE 2

| | Example 1 | Example 2 | Example 3 | Comparative Example 1 | Example 4 | Example 5 | Example 6 | Comparative Example 2 |
|---|---|---|---|---|---|---|---|---|
| Lactone ring-containing acrylic resin | (1A) | (1A) | (1A) | (1A) | (1B) | (1B) | (1B) | (1B) |
| Core-shell type nanoparticles (parts by weight: with respect to 100 parts by weight of (1A) or (1B)) | 5 | 20 | 30 | 0 | 5 | 20 | 30 | 0 |
| Evaluation of adhesion in polarizing plate | ○ | ○ | ○ | x | Δ | ○ | ○ | x |
| Evaluation of external appearance in polarizing plate | ○ | ○ | ○ | Δ | ○ | ○ | ○ | Δ |

As shown in Table 1, in Examples 1 to 3 and Examples 4 to 6 using core-shell type nanoparticles, the total light transparency of the obtained polarizer protective film is 90% or more, and the haze is 5% or less, and thus, it is understood that Examples 1 to 3 and Examples 4 to 6 have excellent optical characteristics and excellent transparency.

As shown in Table 2, in Examples 1 to 3 and Examples 4 to 6 using core-shell type nanoparticles, it is understood that the evaluation of adhesion in the obtained polarizing plate is high, and the evaluation of external appearance is high.

Industrial Applicability

The polarizer protective film and the polarizing plate of the present invention can be preferably used for various kinds of image display apparatuses (liquid crystal display apparatus, organic EL display apparatus, PDP, etc.).

The invention claimed is:
1. A polarizing plate, comprising:
a polarizer formed of a polyvinyl alcohol-based resin, a polarizer protective film and an easy adhesion layer and an adhesive layer between the polarizer protective film and the polarizer,
wherein the polarizer protective film comprises:
50 to 99% by weight of a (meth) acrylic resin having only a lactone ring structure as a ring structure with respect to the polarizer protective film; and
core-shell type nanoparticles having a core layer made of a rubber polymer and a shell layer made of a glass polymer;
wherein the rubber polymer comprises an alkyl(meth)acrylate;
wherein the glass polymer contains at least one monomer selected from an alkyl(meth)acrylate and an aromatic vinyl monomer; and
the lactone ring structure is represented by general formula (1):

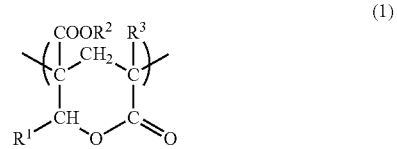

(1)

wherein $R^1$, $R^2$ and $R^3$ independently represent hydrogen atoms or organic residues containing 1 to 20 carbon atoms;
wherein the content of the core-shell type nanoparticles in the polarizer protective film is 1 to 30 parts by weight with respect to 100 parts by weight of the (meth)acrylic resin having the lactone ring structure;
wherein the polarizer protective film is stretched,
wherein the stretching is sequential stretching or simultaneous biaxial stretching with a longitudinal stretching magnification of 1.1 to 3.0 times and a lateral stretching magnification of 1.1 to 3.0 times, and wherein the easy adhesion layer is a silicone layer having a reactive functional group.

2. The polarizing plate according to claim 1, wherein the core-shell type nanoparticles have a particle diameter of 1 to 1,000 nm.

3. The polarizing plate according to claim 1, wherein the adhesive layer is formed of a polyvinyl alcohol-based adhesive.

4. The polarizing plate according to claim 1, comprising a cellulose-based resin film on a side of the polarizer opposite to the polarizer protective film.

5. The polarizing plate according to claim 1, further comprising a pressure-sensitive adhesive layer as at least one of an outermost layer.

6. An image display apparatus comprising at least one polarizing plate according to claim 1.

7. The polarizing plate according to claim 1, wherein the glass transition temperature of the (meth)acrylic resin having a lactone ring structure is 115° C. or higher.

8. The polarizing plate according to claim 1, wherein the glass transition temperature of the rubber polymer is −60° C. to 20° C.

9. The polarizing plate according to claim 1, wherein the glass transition temperature of the glass polymer is 50° C. to 140° C.

10. The polarizing plate according to claim 1, wherein the core layer in the core-shell type nanoparticles has a content ratio of 30 to 95% by weight.

11. The polarizing plate according to claim 1, wherein the shell layer in the core-shell type nanoparticles has a content ratio of 5 to 70% by weight.

12. The polarizing plate according to claim 1 has a tear strength of 2.1 N/mm or more.

13. The polarizing plate according to claim 1 has a moisture permeability of up to 100 g/m$^2$·24 hr.

* * * * *